April 14, 1925.

R. H. WHEATLEY ET AL 1,533,530

INDICATOR

Filed Oct. 6, 1919

Witness
M. G. Crozier

Inventor
Russell H. Wheatley
Leland V. Clark
by their attys
Van Everen Fish & Hildreth Patented Apr. 14, 1925.

1,533,530

UNITED STATES PATENT OFFICE.

RUSSELL H. WHEATLEY AND LELAND V. CLARK, OF NORTH ABINGTON, MASSACHUSETTS.

INDICATOR.

Application filed October 6, 1919. Serial No. 328,644.

*To all whom it may concern:*

Be it known that we, RUSSELL H. WHEATLEY and LELAND V. CLARK, citizens of the United States, both residing at North Abington, in the county of Plymouth and Commonwealth of Massachusetts, have invented certain new and useful Improvements in Indicators; and we do hereby declare the following to be a full, clear, and exact description of the invention, such as will enable others skilled in the art to which it appertains to make and use the same.

The present invention relates to indicators and indicating devices and more particularly to devices for indicating the relation between the operation of operable devices and the energy consumed in operating the same. From a more limited aspect the invention relates to indicators for indicating the relation between the speed of motor vehicles and the rate of fuel consumed in propelling the same.

Motor-vehicle indicators of the above-designated character enable the operator to determine whether the vehicle is operating at the desired efficiency. Those heretofore proposed have not been entirely satisfactory because of their inherent, intermittently operating character, the operator being left entirely in the dark as to the efficiency of the vehicle during the periods of time between successive indications of the indicators.

An object of the invention, therefore, is to provide an indicator which shall continuously indicate the instantaneous value of the relation between the operation of operable devices and the energy consumed in operating the same.

With this and other objects in view, as will appear from the subjoined description, taken in connection with the accompanying drawings, the invention consists of the improved indicator hereinafter described and defined in the appended claims.

Figure 1:
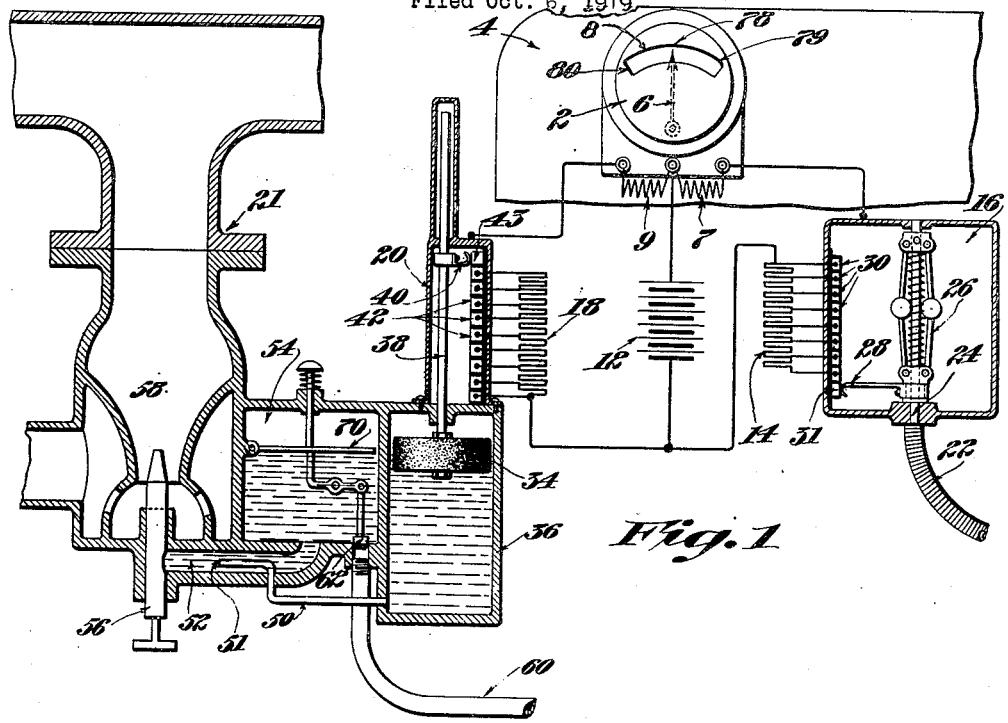
Figure 2:
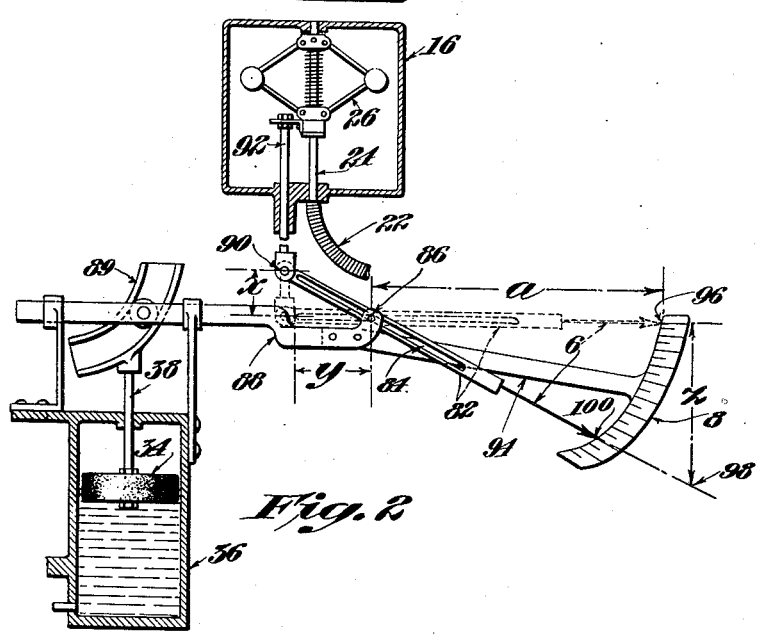

In the accompanying drawings, Figure 1 is a diagrammatic view of a preferred form of the invention, and Figure 2 is a similar view of a modification, as applied to a motor vehicle propelled by an internal combustion engine, for the purpose of indicating the efficiency of operation in terms of miles of travel per gallon of fuel consumed.

In the preferred embodiment of the invention which is diagrammatically illustrated in Fig. 1, an electric meter 2 is employed for indicating the operation of any desired operable device. By way of illustration, the operable device is assumed to be a motor vehicle and the meter 2 is accordingly shown as mounted upon the dashboard 4 thereof. The electric meter 2 is provided with a normally centrally positioned indicator hand 6 for cooperating with a scale 8 indicating miles per gallon, and with a pair of coils 7 and 9 adapted, when electrically energized, to exert magnetically oppositely acting forces upon the indicator hand 6. The hand 6 may be normally maintained in the initial central illustrated position by any well known means (not shown) such as springs. The position of the hand 6 relative to the scale 8 will thus depend upon the relative forces exerted by the two coils. The coils are connected in parallel to a suitable source 12 of electrical energy. The coil 7 is connected in circuit with a resistor 14 that is controlled by the operation of a tachometer 16 and the coil 9 is connected in circuit with a resistor 18 that is under the control of an auxiliary float device 20 on the carbureter 21 of the engine. The operation of the tachometer is responsive to the operation of the operable device; in the present case, to the rate of movement of the vehicle. The operation of the auxiliary float device is responsive to the rate of energy consumed in operating the operable device; as indicated in the present instance, by the rate of fuel consumed in propelling the vehicle. The portions of the resistors 14 and 18 which are in circuit with the coils 7 and 9 being thus controlled in accordance with the rate of movement of the vehicle and the rate of fuel consumed in propelling the same, the forces exerted by the coils upon the hand 6 will be dependent upon the same factors, so that the hand 6 will indicate upon the scale 8 a value dependent upon these factors, viz, miles per gallon.

The tachometer 16 may be operated from a wheel shaft (not shown) or other movable part of the motor vehicle, to which it may be connected by a flexible shaft 22. The flexible shaft is adapted to transmit motion to a shaft 24 having a centrifugal device 26 located thereon and comprising a movable contact 28 for engaging any one of a number of stationary contacts 30 or a stationary contact 31 all of which are insulated from one another. The stationary contacts 30 are connected to taps of the resistor 14.

The float device 20 comprises an auxiliary float 34 in an auxiliary float chamber 36 having secured thereto a stem 38 carrying a movable contact 40. The movable contact 40 is adapted to engage any one of a number of stationary contacts 42 or a stationary contact 43 all of which are insulated from one another. The contacts 42 are connected to taps of the resistor 18.

When the tachometer and the auxiliary float occupy their normal, inoperative positions, they respectively engage the contacts 31 and 43 which are not connected to the resistors 14 and 18, so that the circuits of the coils 7 and 9 are under such circumstances open. The values of the forces exerted by the coils 7 and 9 upon the hand 6 depend upon the portions of the resistors which are in circuit therewith, corresponding to which of the contacts 30 and 42 are engaged by the corresponding contacts 28 and 40.

The auxiliary float chamber 36 is connected by a pipe 50 to a passage 52. The pipe 50 extends into the passage 52 and is provided with a terminal opening 51. The passage 52 leads from the main float chamber 54 of the carbureter, through the needle valve 56, to the mixing chamber 58. The main float chamber 54 is adapted to be supplied with liquid fuel from the main fuel tank (not shown) by a pipe 60. The pipe 60 is provided with the usual valve 62 controlled by the float 70 in the well-known manner to maintain the fuel in the float chamber at substantially the same level irrespective of rate of consumption.

The flow of liquid fuel from the main float chamber 54 through the passage 52 and past the pipe 50 will cause a variation of pressure at the open end 51 of the pipe 50, and the extent of the variation of pressure or degree will depend upon the rate of flow in passage 52. As the pressure is varied at the end 51 of pipe 50, fuel will flow through said pipe, changing the fuel level in the chamber 36 to an extent dependent upon the extent of pressure variation produced at the open end of pipe 50. Thus the rate of flow through the passage 52 will control the level of the liquid fuel in the auxiliary float chamber 36. The position of the auxiliary float 34 in the chamber 36 and, therefore, the position of the contact 40 will consequently depend ultimately upon the rate of consumption of fuel by the engine. The position of the contact 40 is thus an instantaneous measure of the rate of consumption of fuel by the engine. The position of the contact 40 determines the portion of the resistor 18 which is in circuit with the coil 9, thereby determining the value of the current passing through the coil and the influence thereof upon the hand 6.

Similarly, the position of the contact 28 is an instantaneous measure of the speed of the vehicle and determines the portion of the resistor 14 in circuit with the coil 7 of the meter 2, thereby determining the force exerted by the coil 7 upon the hand 6. The hand 6 will thus be actuated over the scale 8 in accordance with the value of the resultant force exerted by the oppositely acting coils 7 and 9. The resultant force, of course, will be the difference of the two forces exerted by the coils.

The taps of the resistors 14 and 18 should be so designed and the scale 8 so graduated that the position of the hand 6 with respect to the scale may indicate the relation between the speed of the vehicle and the rate of energy consumed by the engine in propelling the same. One method of attaining this result will now be described.

The relation between the speed of the vehicle and the rate of energy consumed by the engine in propelling the same may be expressed in a number of different ways. One convenient way is that illustrated, viz, to express the distance travelled by the vehicle in terms of the quantity of liquid fuel consumed during such travel as, for example, so many miles per gallon. The position of the contact 40 measures the quantity of fuel consumed per unit of time, say, so many gallons per hour. The position of the contact 28 measures the speed of the vehicle, say, so many miles per hour. The ratio of the miles per hour of the vehicle to the energy consumed per hour will therefore express the number of miles travelled by the vehicle per gallon of fuel consumed during such travel. For example, if the vehicle is travelling at the rate of 30 miles per hour and the engine is consuming liquid fuel at the rate of 2 gallons per hour, the resulting distance travelled in terms of the gallons of fuel consumed will be the ratio of 30 to 2, or fifteen miles per gallon.

The logarithm of the ratio of two quantities is equal to the difference of their logarithms. The hand 6 is moved a distance proportional to the difference of the two forces exerted by the coils 7 and 9. The distance moved by the hand 6 will therefore represent the ratio of the two above-mentioned quantities if the forces of the two coils are proportional to the logarithms of these two quantities.

By experiment, or in any other desired manner, it may be determined what speeds of the vehicle correspond to positions of the contact 28 in which it engages the various contacts 30. The taps of the resistor 14 which lead to the contacts 30 may then be so designed that the value of the current flowing through the coil 7 will vary proportionately to the logarithms of the vehicle speeds. The force exerted upon the hand 6 by the coil 7 will then vary as the logarithm of the speed of the vehicle. When the vehicle speed is 20 miles per hour, for example, the force exerted by the coil 7 upon the hand 6, tending to move the hand toward the right, will be proportional to the logarithm of 20; if the speed is 30 miles per hour, the force will be proportional to the logarithm of 30; and so on. Similarly, the taps of the resistor 18 may be so designed that the current flowing through the coil 9 will vary as the logarithm of the rate of fuel consumption. The force exerted upon the hand 6 by the coil 9 will then vary proportionately to the logarithm of the rate of fuel consumption. This force will tend to actuate the hand 6 toward the left. As the forces exerted by the coils act oppositely, the resulting forces upon the hand 6 will be the difference of the two. The hand 6 will therefore be moved a distance proportional to the difference of these forces, that is a distance proportional to the difference of the above mentioned logarithms of the vehicle speed and the rate of fuel consumption.

As the difference of the logarithms of two quantities is equal to the logarithm of the ratio of the quantities, the hand 6 will be moved a distance proportional to the logarithm of the ratio of the vehicle speed to the rate of energy consumed by the engine. The hand will therefore indicate this ratio upon a suitably graduated logarithmic scale, the successively numbered divisions of which are located at distances from the initial central point 78 which are proportional to the logarithms of the numbers corresponding to the divisions, as is the case with ordinary slide-rule scales. Thus, the initial central division of the scale, indicated in Figure 1 by the numeral 78, may be represented by the number 1, for a reason which will hereinafter appear. The number 2 will indicate the division which is at a distance from the initial division 78 proportional to the logarithm of 2. The number 3 will indicate the division which is at a distance from the initial division 78 proportional to the logarithm of 3, and so on. With the taps of the resistors designed as above described, and with a logarithmic scale of this character the coil 7 will tend to move the hand 6 toward the right with a force proportional to the logarithm of the vehicle speed, the coil 9 will tend to move the hand toward the left with a force proportional to the logarithm of the rate of fuel consumption by the engine, and the hand will come to rest at a point of the logarithmic scale determined by the difference of these logarithms, at which it will indicate accurately the number of miles travelled by the vehicle per gallon of liquid fuel consumed during such travel.

Thus, if the vehicle is coasting down hill, for example, so that the energy consumption is zero, the level of the liquid fuel in the float chamber 36 will be normal and the contact 40 will engage the contact 43. The circuit of the resistor 18 and the coil 9 will then be broken. Under these conditions, the other coil 7 will alone be operative to move the hand 6 to the infinite point of the scale, bearing the reference numeral 79. The hand will then indicate upon the scale that the ratio of the number of miles travelled by the vehicle to the amount of energy consumed is very large. On the other hand, if the engine is operated while the vehicle is at rest, the contact 28 will engage the contact 31, breaking the circuit of the coil 7, in which case the coil 9 will alone be operative to move the hand 6 against a stop pin at the zero point of the scale, bearing the reference numeral 80.

If the number of miles travelled per gallon of liquid fuel consumed during such travel is unity, as, for example, where the vehicle is travelling at the rate of 5 miles per hour and fuel is consumed by the engine at the rate of 5 gallons per hour, the coils 7 and 9 will exert equal oppositely acting forces upon the hand 6, tending to maintain the hand in the central position, as illustrated, opposite the point 78. The logarithm of unity is zero, but if the scale 8 is graduated as above described, the hand 6, when occupying this central position, will indicate the number 1 upon the scale.

If the number of miles travelled per gallon of liquid fuel consumed during such travel is 2, as where the vehicle is travelling at the rate of 10 miles per hour, and fuel is consumed by the engine at the rate of 5 gallons per hour, the coil 7 will tend to move the hand 6 toward the right with a force proportional to the logarithm of 10 and the coil 9 will tend to move the hand 6 toward the left with a force proportional to the logarithm of 5. There will be a resulting force equal to the difference of these logarithms, or to the logarithm of 2, which force will actuate the hand 6 to a position to the right of the point 78, at a distance from the point 78 that is proportional to the logarithm of 2, and which will be indicated upon the scale by the numeral 2. The hand will in all cases indicate upon the scale the number of miles travelled per gallon of liquid fuel consumed.

It will be noted that the indications of the hand 6 are practically continuous, the continuity depending upon the number of contacts 30 and 42, which may, in practice, be very large. The indications are therefore readily responsive to changes in the speed of the vehicle and the rate of energy consumption by the engine. It is not necessary for the operator to wait for an interval of time until the hand is moved to new positions of the scale at the end of predetermined operations, as is the case with indicators hitherto proposed, but the operator may at any moment, by glancing at the meter 2, determine the efficiency of the machine at that particular moment, as expressed in miles per gallon.

It will be noted, further, that the electric meter 2 may be situated anywhere upon the vehicle, upon the dashboard 4, for example, the distance of the meter from the other operating parts being dependent simply upon the length of the conductors connecting the meter to these parts.

In Fig. 2, a modification is illustrated in which the connections of the hand 6 to the tachometer and the auxiliary float device are mechanical instead of electrical. In this figure the hand 6 is rigidly mounted on the lower end of a longitudinally slotted rod 82 within the slot 84 of which is slidably mounted a pin 86 that is carried at one end of a horizontally longitudinally movable arm 88. The longitudinal movements of the arm 88 are controlled by a cam 89 mounted upon the stem 38 of the auxiliary float device in such fashion that the horizontal distance traversed by the pin 86 shall be proportional to the rate of fuel consumed by the engine. The movements of the float device will thus be connected into pivotal movements of the rod 82 about a pivotal point 90. The pivotal point 90 is slidably movable vertically in response to the action of the tachometer, to which it is pivotally connected by a vertically longitudinally movable arm 92. The point 90 at the end of the arm 82 is thus constrained to move vertically in response to a force proportional to the vehicle speed and the arm 82 is adapted to be moved pivotally about the point 90 in response to a horizontally acting force which is proportional to the rate of fuel consumption. The scale 8 should preferably be rigidly secured to the arm 88, as by an arm 94, so as to be horizontally movable therewith, whereby the scale 8 may be maintained at a fixed distance from the pin 86.

Under normal conditions, when the engine is not moving and the vehicle is not moving, the arm 82 will occupy the dotted-line position, in which the hand 6 will indicate the point 96, which may be taken as the initial point of the scale. When the engine and the vehicle are both in action the point 90 will be moved vertically upward a distance $x$ proportional to the vehicle speed, and the pin 86 will be moved horizontally to the right a distance $y$ proportional to the rate of fuel consumption.

The hand will then indicate a point 98 at a vertical distance $z$ from the point 96. If the fixed distance of the point 96 from the pin 86 be represented by $a$, it will readily be found that $$z = a\frac{x}{y};$$

that is, that $z$ is proportional to the ratio of $x$ to $y$. The distance $z$ therefore accurately represents the instantaneous value of the number of miles travelled per gallon of fuel consumed. In practice, the distance $z$ may be laid off upon the scale 8 so that the point 100 will give the same reading as the point 98. The indications of the hand 6 will, of course, be continuous, being readily responsive to changes in the speed of the vehicle and the energy consumed by the engine.

Although several preferred embodiments of the invention have been herein illustrated and described, and a preferred control for an indicator hand explained, it will be understood that the invention is not restricted to the preferred embodiments of the preferred control, but is of broader scope, being limited only in so far as limitations may be specifically imposed in the annexed claims.

We claim:

1. In a vehicle having an engine for propelling the same and a tachometer, the combination with a float chamber adapted to contain liquid fuel, means whereby the level of the liquid fuel is controlled in accordance with the rate of consumption of fuel by the engine, a float in the chamber, and devices controlled by the tachometer and the float for indicating the relation between the speed of the vehicle and the fuel consumed by the engine in propelling the vehicle.

2. In a vehicle having an engine for propelling the same, the combination with a main float chamber for supplying liquid fuel to the engine, an auxiliary float chamber containing liquid fuel, means for controlling the level of the liquid fuel in the auxiliary chamber in accordance with the rate of flow of liquid fuel from the main float chamber to the engine, and means controlled in accordance with the level of the liquid fuel in the auxiliary chamber and the speed of the vehicle for indicating the relation between the speed of the vehicle and the rate of fuel consumed by the engine in propelling the vehicle.

3. In a device of the kind specified, devices for continuously indicating the relation between the movement of the vehicle and the energy consumed in propelling the same, said devices comprising two elements, one a scale and the other a pointer, one of said elements being fixed and the other movable, and mechanism immediately responsive to variations in the movement of the vehicle and in the rate of energy consumption for continuously actuating the movable element.

4. In a vehicle having an engine for propelling the same and a tachometer, the combination with a main chamber adapted to receive liquid fuel, a connection from said chamber to deliver fuel to the engine, an auxiliary chamber, a pipe from the auxiliary chamber extending into said connection with its end open in the direction of flow of fuel whereby the level of the fuel in the auxiliary chamber will vary in accordance with the rate of flow through said connection, a float in the auxiliary chamber responsive to variations in the fuel level therein, and devices controlled by the tachometer and the float for indicating the relation between the speed of the vehicle and the fuel consumed by the engine in propelling the vehicle.

RUSSELL H. WHEATLEY.
LELAND V. CLARK.